United States Patent [19]

Valyocsik

[11] Patent Number: 4,585,747
[45] Date of Patent: Apr. 29, 1986

[54] SYNTHESIS OF CRYSTALLINE SILICATE ZSM-48

[75] Inventor: Ernest W. Valyocsik, Yardley, Pa.

[73] Assignee: Mobil Oil Corporation, New York, N.Y.

[21] Appl. No.: 625,375

[22] Filed: Jun. 27, 1984

[51] Int. Cl.$^4$ .................. C01B 33/28; B01J 29/06
[52] U.S. Cl. ..................... 502/62; 423/328; 423/329; 502/77
[58] Field of Search ................. 423/326–333, 423/335; 502/62, 71, 77

[56] References Cited

U.S. PATENT DOCUMENTS

| | | | |
|---|---|---|---|
| 4,397,827 | 8/1983 | Chu | 423/326 |
| 4,427,788 | 1/1984 | Miale | 423/328 X |
| 4,481,177 | 11/1984 | Valyocsik | 423/328 |

Primary Examiner—Edward J. Meros
Attorney, Agent, or Firm—Alexander J. McKillop; Michael G. Gilman; Dennis P. Santini

[57] ABSTRACT

This invention relates to a new and improved form of crystalline silicate identified as zeolite ZSM-48, to a new and useful improvement in synthesizing said crystalline silicate and to use of said crystalline silicate prepared in accordance herewith as a catalyst for organic compound, e.g. hydrocarbon compound, conversion.

13 Claims, No Drawings

SYNTHESIS OF CRYSTALLINE SILICATE ZSM-48

BACKGROUND OF THE INVENTION

1. Field Of The Invention

This invention relates to a new and improved form of crystalline silicate ZSM-48, to a new and useful improvement in synthesizing said crystalline silicate and to use of the crystalline silicate prepared in accordance herewith as a catalyst for organic compound, e.g. hydrocarbon compound, conversion.

More particularly, this invention relates to an improved method of preparing crystalline silicate ZSM-48 whereby synthesis is facilitated and reproducible and the silicate product exhibits high purity and catalytic utility.

2. Discussion Of Prior Art

Crystalline zeolite ZSM-48 and its conventional preparation are taught by U.S. Pat. No. 4,397,827, the entire disclosure of which is incorporated herein by reference. It has a distinctive X-ray diffraction pattern which identifies it from other known crystalline silicates.

Applicant knows of no prior art methods for preparing crystalline zeolite ZSM-48 utilizing the present improved method.

U.S. Pat. No. 4,296,083 teaches a method for synthesis of high silica zeolites of intermediate pore size involving careful control of reaction mixture content and the presence of an organic nitrogen-containing cation source such as, for example, a dibenzyldimethylammonium compound.

SUMMARY OF THE INVENTION

An improved reproducible method for preparing an improved crystalline silicate identified as zeolite ZSM-48 exhibiting high purity, catalytic activity and other valuable properties is provided which comprises forming a reaction mixture containing sources of alkali metal oxide, an organic nitrogen-containing cation, an oxide of aluminum, an oxide of silicon and water and having a composition, in terms of mole ratios, within the following ranges:

|  | Broad | Preferred |
|---|---|---|
| $SiO_2/Al_2O_3$ | greater than 180 | 250–20,000 |
| $H_2O/SiO_2$ | 5–200 | 10–100 |
| $OH^-/SiO_2$ | 0.01–2.0 | 0.2–1.0 |
| $M/SiO_2$ | 0.01–3.0 | 0.1–1.0 |
| $R/SiO_2$ | 0.02–1.5 | 0.05–0.6 | wherein R is a cation derived from the monomeric, diquaternary compound bis(N-methylpyridyl)ethylinium and M is an alkali metal ion, and maintaining the mixture until crystals of the crystalline zeolite ZSM-48 are formed. The reaction mixture $SiO_2/Al_2O_3$ mole ratio can vary over a broad range above about 180, preferably from about 250, and can approach infinity or be as close to infinity as possible and still provide the desired result. The quantity of $OH^-$ is calculated only from the inorganic sources of alkali without any organic base contribution. Thereafter, the crystals are separated from the liquid and recovered. Reaction conditions required consist of heating the foregoing reaction mixture to a temperature of from about 80° C. to about 250° C. for a period of time of from about 24 hours to about 60 days. A more preferred temperature range is from about 100° C. to about 200° C. with the amount of time at a temperature in such range being from about 48 hours to about 7 days.

The digestion of the gel particles is carried out until crystals form. The solid product is separated from the reaction medium, as by cooling the whole to room temperature, filtering and water washing.

EMBODIMENTS

Zeolite ZSM-48 synthesized under conventional procedure is proven to have catalytic application. When the crystalline silicate is synthesized in accordance with the present method, it exhibits high purity and significantly enhanced catalytic activity for certain conversions of interest, including conversion of methanol to olefins and toluene alkylation. Further, the prior conventional reaction mixture for preparation of crystalline zeolite ZSM-48, i.e. requiring an organic directing agent described as a mixture of $C_2$–$C_{12}$ alkylamine and tetramethylammonium compound, is more costly than the present invention method, less reproducible with certainty, and requires the reaction mixture silica/alumina mole ratio to be at least about 500 to avoid product contamination with other silicates, notably crystalline silicates ZSM-5 or ZSM-11. The present method allows the reaction mixture silica/alumina mole ratio to be much less than 500, e.g. as low as about 180, to produce relatively pure ZSM-48. It is noted, however, that the reaction mixture silica/alumina mole ratio in the present method is critical, since at 180 or less, crystals of silicate other than ZSM-48 are produced.

The particular effectiveness of the presently required different organic directing agent, i.e. the bis(N-methylpyridyl)ethylinium compound, hereafter more particularly described, when compared with other directing agents, such as that identified in U.S. Pat. No. 4,397,827, is believed due to its ability to function as a template in the nucleation and growth of zeolite ZSM-48 crystals in the above reaction mixture. In a different reaction mixture, this directing agent causes ZSM-35 to crystallize (U.S. application Ser. No. 625,377, filed on the same date herewith). In still a further different reaction mixture, this directing agent directs formation of ZSM-12 (U.S. application Ser. No. 625,376, filed on the same date herewith).

The reaction mixture composition for the synthesis of synthetic crystalline silicate hereby can be prepared utilizing materials which can supply the appropriate oxide. Such compositions include aluminates, alumina, silicates, silica hydrosol, silica gel, silicic acid and hydroxides. It will be understood that each oxide component utilized in the reaction mixture for preparing zeolite ZSM-48 can be supplied by one or more essential reactants and they can be mixed together in any order. For example, any oxide can be supplied by an aqueous solution, sodium hydroxide or by an aqueous solution of a suitable silicate; the organic cation can be supplied by the directing agent compound of that cation, such as, for example, the hydroxide or a salt, e.g. halide, such as chloride or bromide. The reaction mixture can be prepared either batchwise or continuously. Crystal size and crystallization time for the zeolite ZSM-48 composition will vary with the exact nature of the reaction mixture employed.

The organic directing agent required of the present method is the monomeric, diquaternary compound bis(N-methylpyridyl)ethylinium. The required directing agent has the structure

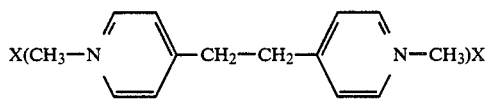

wherein X is an anion, non-limiting examples of which include halide (e.g. fluoride, chloride, bromide, iodide), hydroxide, acetate, sulfate, carboxylate, etc.

The zeolite ZSM-48 composition as prepared hereby can be identified, in terms of mole ratios of oxides and in the anhydrous state, as follows:

(0.1 to 4)$R_2O$:(0.01 to 2)$M_{2/n}O$:
(0 to 0.5)$Al_2O_3$:(100)$SiO_2$ wherein M is at least one cation having a valence n and R is the cation derived from the monomeric, diquaternary compound, above described.

The original cations, e.g. alkali metal, can be replaced, at least in part, by calcination and/or ion exchange with another cation. Thus, the original cations are exchanged into a hydrogen or hydrogen ion precursor form or a form in which the original cation has been replaced by a metal of Groups IIA, IIIA, IVA, IB, IIB, IIIB, IVB, VIB or VIII of the Periodic Table. Thus, for example, it is contemplated to exchange the original cations with ammonium ions or with hydronium ions. Catalytically active forms of these would include, in particular, hydrogen, rare earth metals, aluminum, metals of Groups II and VIII of the Periodic Table and manganese.

The X-ray diffraction pattern of the crystalline silicate ZSM-48 has the characteristic lines shown in Table 1 and is further characterized by the fact that it exhibits a singlet line within the range of 11.8±0.2 Angstrom units. ZSM-48 does not have more than one X-ray diffraction line at 11.8±0.2 Angstrom units. The presence of only a singlet line at the indicated spacing structurally distinguishes the ZSM-48 material from closely related materials such as ZSM-12 (U.S. Pat. No. 3,832,449) which has a doublet (two lines) at 11.8±0.2 Angstrom units and high silica ZSM-12 (U.S. Pat. No. 4,104,294) which also exhibits a doublet at 11.8±0.2 Angstrom units.

TABLE 1

| Interplanar d-Spacing (A) | Relative Intensity ($I/I_o$) |
| --- | --- |
| 11.8 ± 0.2 | s |
| 10.2 ± 0.2 | w-m |
| 7.2 ± 0.15 | w |
| 4.2 ± 0.08 | vs |
| 3.9 ± 0.08 | vs |
| 3.6 ± 0.06 | w |
| 3.1 ± 0.05 | w |
| 2.85 ± 0.05 | w |

These values were determined by standard technique. The radiation was the K-alpha doublet of copper, and a diffraction equipped with a scintillation counter and a strip chart pen recorder was used. The peak heights, I, and the positions as a function of two times theta, where theta is the Bragg angle, were read from the spectrometer chart. From these, the relative intensities, 100 $I/I_o$ where $I_o$ is the intensity of the strongest line or peak, and d (obs.), the interplanar spacing in Angstrom units (A) corresponding to the recorded lines, were calculated. In Table 1 the relative intensities are given in terms of the symbols w=weak, m=medium, s=strong, vs=very strong, etc. Ion exchange of the sodium ions with cations reveals substantially the same pattern with some minor shifts in interplanar spacing and variation in relative intensity. Other minor variations can occur depending on the silicon to aluminum ratio of the particular sample, as well as if it has been subjected to thermal treatment.

While the improved crystalline silicate of the present invention may be used in a wide variety of organic compound, e.g. hydrocarbon compound, conversion reactions, it is notably useful in the processes of polymerization, aromatization and cracking. Other conversion processes for which improved zeolite ZSM-48 may be utilized in one or more of its active forms include, for example, hydrocracking and converting light aliphatics to aromatics such as in U.S. Pat. No. 3,760,024, the disclosure of which is incorporated herein by reference.

Synthetic zeolite ZSM-48 prepared in accordance herewith can be used either in the organic nitrogen-containing and alkali metal contaning form, the alkali metal form and hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to zeolite ZSM-48 such as, for example, by, in the case of platinum, treating the zeolite with a platinum metal-containing ion. Suitable platinum compounds for this purpose include chloroplatinic acid, platinous chloride and various compounds containing the platinum amine complex. Combinations of metals and methods for their introduction can also be used.

Synthetic zeolite ZSM-48, when employed either as an adsorbent or as a catalyst in a hydrocarbon conversion process, should be dehydrated at least partially. This can be done by heating to a temperature in the range of from about 200° C. to about 600° C. in an inert atmosphere, such as air, nitrogen, etc. and at atmospheric or subatmospheric pressures for between 1 and 48 hours. Dehydration can also be performed at lower temperature merely by placing the zeolite in a vacuum, but a longer time is required to obtain a particular degree of dehydration. The thermal decomposition product of the newly synthesized ZSM-48 can be prepared by heating same at a temperature up to about 815° C. for from 1 hour to about 48 hours.

As above mentioned, synthetic zeolite ZSM-48 prepared in accordance herewith can have the original cations associated therewith replaced by a wide variety of other cations according to techniques well known in the art. Typical replacing cations include hydrogen, ammonium and metal cations including mixtures thereof. Of the replacing metallic cations, particular preference is given to cations of metals such as rare earths, Mn, Ca, Mg, Zn, Cd, Pd, Ni, Cu, Ti, Al, Sn, Fe and Co.

Typical ion exchange technique would be to contact the synthetic zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolite is then preferably washed with water and dried at a temperature ranging from 65° C. to about 315° C. and thereafter may be calcined in air or other inert gas at temperatures ranging from about 200° C. to about 815° C. for periods of time ranging from 1 to 48 hours or more to produce a catalytically-active thermal decomposition product thereof.

Regardless of the cation replacing the alkali metal in the synthesized form of the zeolite ZSM-48, the spatial arrangement of the aluminum, silicon and oxygen atoms which form the basic crystal lattices of zeolite ZSM-48 remains essentially unchanged by the described replacement of alkali metal as determined by taking an X-ray powder diffraction pattern of the ion-exchanged material.

The crystalline silicate prepared by the instant invention is formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the crystalline silicate can be extruded before drying or dried or partially dried and then extruded.

In the case of many catalysts, it is desired to incorporate the zeolite ZSM-48 hereby prepared with another material resistant to the temperatures and other conditions employed in certain organic conversion processes. Such matrix materials include active and inactive materials and synthetic or naturally occurring zeolites as well as incorganic materials such as clays, silica and/or metal oxides, e.g. alumina. The latter may be either naturally occurring or in the form of gelatinous precipitates, sols or gels including mixtures of silica and metal oxides. Use of a material in conjuction with the zeolite ZSM-48, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline silicate materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized zeolite ZSM-48 include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolite ZSM-48 catalyst hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline silicate and inorganic oxide gel matrix vary widely with the crystalline silicate content ranging from about 1 to about 90 percent by weight, and more usually in the range of about 2 to about 50 percent by weight of the composite.

In general, organic compounds such as, for example, those selected from the group consisting of hydrocarbons, alcohols and ethers, are converted to conversion products such as, for example, aromatics and lower molecular weight hydrocarbons, over the catalytically active form of the composition of this invention by contact under organic compound conversion conditions including a temperature of from about 100° C. to about 800° C. a pressure of from about 0.1 atmosphere (bar) to about 200 atmospheres, a weight hourly space velocity of from about 0.08 $hr^{-1}$ to about 2000 $hr^{-1}$ and a hydrogen/feedstock organic compound mole ratio of from 0 (no added hydrogen) to about 100.

Such conversion processes include, as non-limiting examples, cracking hydrocarbons to lower molecular weight hydrocarbons with reaction conditions including a temperature of from about 300° C. to about 800° C., a pressure of from about 0.1 atmosphere (bar) to about 35 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospherss, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components to product enriched in p-xylene with reaction conditions including a temperature from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene to product comprising benzene and xylenes with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

In order to more fully illustrate the nature of the invention and the manner of practicing same, the following examples are presented.

EXAMPLES

Experiments listed in Table 2 were conducted to demonstrate the present improved method for synthesis of crystalline silicate ZSM-48. By the present improved method of synthesis, it was possible to produce relatively pure ZSM-48 from a reaction mixture having a silica/alumina mole ratio greater than about 180.

The monomeric, diquaternary compound employed in these experiments was the iodide salt. In Table 2, R represents the cation derived from the diquaternary compound. Only in experiment 8 the other reaction mixture components were Q-brand sodium silicate (27.8% $SiO_2$; 8.4% $Na_2O$; 63.8% $H_2O$), $Al_2(SO_4)_3 \cdot 16\text{-}H_2O$, $H_2SO_4$ and water. In all the other experiments listed in Table 2, except experiment 12, the other reaction mixture components were silica sol (30% $SiO_2$; 70% $H_2O$), $NaAlO_2$, $NaOH$ and water. In experiment 12 the other reaction mixture components were silica sol, $NaOH$ and water. The $Al_2O_3$ source was deliberately omitted from experiment 12.

In each experiment listed in Table 2, the crystallization time is given together with the resulting crystalline product. The crystallization temperature was maintained at 160° C., with stirring, during crystallization for each experiment. Each experiment was done in a stirred 300 ml autoclave. Note in experiments 1 through 8 that when the $SiO_2/Al_2O_3$ ratio of the reaction mixture is less than 180, synthesis with the present directing agent, at the proper composition, tends to produce a product of different crystalline framework, i.e. not ZSM-48.

The final product of each experiment was filtered, washed with water, and dried at 110° C.

TABLE 2

| Experiment | Reaction Mixture Composition (Mole Ratios) | | | | | Reaction Time, days | Product (% crystallinity) |
|---|---|---|---|---|---|---|---|
| | $SiO_2/Al_2O_3$ | $H_2O/SiO_2$ | $OH^-/SiO_2$ | $Na^+/SiO_2$ | $R/SiO_2$ | | |
| 1 | 10 | 40 | 0.20 | 0.40 | 0.10 | 4 | Crystalline product other than ZSM-48 (5%) |
| 2 | 15 | 40 | 0.20 | 0.33 | 0.10 | 4 | Crystalline product other than ZSM-48 (90%) |
| 3 | 20 | 40 | 0.20 | 0.30 | 0.10 | 4 | Crystalline product other than ZSM-48 (100%) |
| 4 | 30 | 40 | 0.20 | 0.27 | 0.08 | 8 | Crystalline product other than ZSM-48 (100%) |
| 5 | 40 | 40 | 0.30 | 0.35 | 0.10 | 5 | Crystalline product other than ZSM-48 (100%) |
| 6 | 60 | 40 | 0.20 | 0.22 | 0.10 | 8 | Crystalline product other than ZSM-48 (100%) |
| 7 | 90 | 40 | 0.20 | 0.29 | 0.10 | 7 | Crystalline product other than ZSM-48 (100%) |
| 8 | 90 | 40 | 0.20 | 0.59 | 0.10 | 7 | Crystalline product other than ZSM-48 (100%) |
| 9 | 180 | 40 | 0.20 | 0.24 | 0.10 | 7 | ZSM-48 (50%) + crystalline product other than ZSM-48 (50%) |
| 10 | 300 | 40 | 0.20 | 0.21 | 0.10 | 5 | ZSM-48 (65%) |
| 11 | 500 | 40 | 0.20 | 0.20 | 0.10 | 5 | ZSM-48 (75%) |
| 12 | "infinity" | 40 | 0.20 | 0.20 | 0.10 | 7 | ZSM-48 (100%) |

As-synthesized crystalline products from experiments listed in Table 2 were submitted for chemical analysis and X-ray diffraction analysis. Table 3 lists the analytical compositions of the products from experiments 10–12. The "composition" information in Table 3 was calculated on the basis of 100 ($SiO_2 + AlO_4$) tetrahedra. Table 4 lists the X-ray diffraction pattern of the product from experiment 11 in its as-synthesized form.

TABLE 3

| Experiment | moles C/mole N | Moles per mole $Al_2O_3$ | | | Composition | | | |
|---|---|---|---|---|---|---|---|---|
| | | $N_2O$: | $Na_2O$: | $SiO_2$ | Al/100 $T_d$ | $Na^+$/100 $T_d$ | N/100 $T_d$ | Molecules R/100 $T_d$ |
| 10 | 7.7 | 6.5 | <0.04 | 278 | 0.71 | <0.03 | 4.63 | 2.56 |
| 11 | 7.3 | 9.0 | <0.05 | 382 | 0.52 | <0.03 | 4.69 | 2.45 |
| 12 | 7.2 | 368 | 44 | >14,900 | <0.01 | 0.60 | 4.94 | 2.53 |

TABLE 4

| Interplanar d-Spacings (Å) | Observed 2 × Thet | Relative Intensities $I/I_o$ |
|---|---|---|
| 11.63 | 7.59 | 18.9 |
| 10.03 | 8.81 | 8.0 |
| 5.81 | 15.23 | 4.9 |
| 4.91 | 18.03 | 1.1 |
| 4.87 | 18.20 | 2.4 |
| 4.19 | 21.19 | 100.0 |

TABLE 4-continued

| Interplanar d-Spacings (A) | Observed 2 × Thet | Relative Intensities $I/I_o$ |
| --- | --- | --- |
| 4.08 | 21.77 | 4.1 |
| 4.05 | 21.94 | 3.4 |
| 3.99 | 22.24 | 4.9 |
| 3.86 | 23.02 | 95.7 |
| 3.77 | 23.60 | 2.6 |
| 3.73 | 23.84 | 0.8 |
| 3.56 | 24.96 | 10.3 |
| 3.51 | 25.38 | 6.0 |
| 3.44 | 25.85 | 9.5 |
| 3.39 | 26.24 | 1.0 |
| 2.90 | 30.81 | 3.5 |
| 2.84 | 31.49 | 13.2 |
| 2.73 | 32.81 | 3.6 |

What is claimed is:

1. A method for synthesizing a crystalline silicate ZSM-48 exhibiting a characteristic X-ray diffraction pattern as shown in Table 1 of the specification, which comprises (i) preparing a mixture capable of forming said crystalline silicate, said mixture containing sources of alkali metal cations, bis(N-methylpyridyl)ethylinium cation, an oxide of silicon and water and having a composition, in terms of mole ratios, within the following ranges:

| | |
| --- | --- |
| $SiO_2/Al_2O_3$ | above about 250 |
| $H_2O/SiO_2$ | 5–200 |
| $OH^-/SiO_2$ | 0.01–2.0 |
| $M/SiO_2$ | 0.01–3.0 |
| $R/SiO_2$ | 0.02–1.5 | wherein M is said alkali metal cation and R is said bis(N-methylpyridyl)ethylinium cation, (ii) maintaining the mixture at a temperature of from about 80° C. to about 250° C. until crystals of the crystalline silicate are formed and (iii) recovering the crystalline silicate ZSM-48 from step (ii), said recovered crystalline silicate containing alkali metal and bis(N-methylpyridyl)ethylinium cations.

2. The method of claim 1 wherein said mixture has a composition, in terms of mole ratios, as follows:

| | |
| --- | --- |
| $SiO_2/Al_2O_3$ | 250–20,000 |
| $H_2O/SiO_2$ | 10–100 |
| $OH^-/SiO_2$ | 0.2–1.0 |
| $M/SiO_2$ | 0.1–1.0 |
| $R/SiO_2$ | 0.05–0.6 |

3. The method of claim 1 comprising replacing alkali metal cations of the crystalline silicate recovered in step (iii), at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

4. The method of claim 2 comprising replacing alkali metal cations of the crystalline silicate recovered in step (iii), at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

5. The method of claim 3 wherein said replacing cation is hydrogen or a hydrogen precursor.

6. The method of claim 4 wherein said replacing cation is hydrogen or a hydrogen precursor.

7. The recovered crystalline silicate ZSM-48 product of claim 1.

8. The recovered crystalline silicate ZSM-48 product of claim 2.

9. The bis(N-methylpyridyl)ethylinium-containing crystalline silicate ZSM-48 product of claim 3.

10. The bis(N-methylpyridyl)ethylinium-containing crystalline silicate ZSM-48 product of claim 4.

11. The bis(N-methylpyridyl)ethylinium-containing crystalline silicate ZSM-48 product of claim 5.

12. The bis(N-methylpyridyl)ethylinium-containing crystalline silicate ZSM-48 product of claim 6.

13. Bis(N-methylpyridyl)ethylinium-containing ZSM-48.

* * * * *

UNITED STATES PATENT AND TRADEMARK OFFICE
CERTIFICATE OF CORRECTION

PATENT NO. : 4,585,747

DATED : April 29, 1986

INVENTOR(S) : Ernest W. Valyocsik

It is certified that error appears in the above-identified patent and that said Letters Patent is hereby corrected as shown below:

Column 8, line 63, Table 4, heading of second column reading "2 x The" should be --2 x Theta--

Column 9, line 4, Same as above

Signed and Sealed this

Tenth Day of February, 1987

Attest:

DONALD J. QUIGG

Attesting Officer

Commissioner of Patents and Trademarks